United States Patent [19]

Smyth et al.

[11] 3,868,357
[45] Feb. 25, 1975

[54] ALKANEDIOIC ACID DERIVATIVES OF INSULIN

[75] Inventors: Derek George Smyth; Arthur Sai Chun Ko, both of London, England

[73] Assignee: National Research Development Corporation, London, England

[22] Filed: Jan. 26, 1972

[21] Appl. No.: 221,060

[30] Foreign Application Priority Data
Jan. 28, 1971 Great Britain ...................... 3387/71

[52] U.S. Cl. ............................... 260/112.7, 424/178
[51] Int. Cl... C07c 103/52, C07g 7/00, A61k 17/02
[58] Field of Search ....................... 260/112.7, 112.5

[56] References Cited
UNITED STATES PATENTS

| 3,308,028 | 3/1967 | deVries | 260/112.7 |
| 3,471,464 | 10/1969 | Bellet et al. | 260/112.7 |
| 3,481,917 | 12/1969 | Grant et al. | 260/112.7 |
| 3,684,791 | 8/1972 | Geiger et al. | 260/112.7 |

FOREIGN PATENTS OR APPLICATIONS

| 1,157,528 | 7/1969 | Great Britain | 260/112.7 |

OTHER PUBLICATIONS

Tietze et al.: Biochim. Biophys. Acta, 59, 336–46 (1962).

*Primary Examiner*—Elbert L. Roberts
*Assistant Examiner*—Reginald J. Suyat

[57] ABSTRACT

Insulin derivatives which are water soluble, readily isolated, immunologically acceptable and which retain hypoglycaemic activity are those in which at least one of the $A_1$, $B_1$ and $B_{29}$ aminoacid amino groups is converted into a blocked amino group having a substituent capable of forming an anion, e.g., by substitution with dicarboxylic acid radicals.

18 Claims, No Drawings

ALKANEDIOIC ACID DERIVATIVES OF INSULIN

This invention relates to insulin derivatives.

As more comprehensive methods of detection of diabetes mellitus are introduced and as the normal expectation of life becomes longer the recorded incidence of this disease is increasing steadily. Present treatment consists of dietary control usually in combination with insulin injections or with an oral anti-diabetic drug and in frequent cases injections once or twice daily are necessary throughout the life of the patient. Even with such treatment the patient's blood sugar level varies considerably from normal necessitating a strict diet. Oral drugs are suitable only in mild cases of diabetes and are now considered to have certain undesirable side effects. In addition to the above mentioned disadvantages of present treatment, a proportion of diabetics produce antibodies to insulin and become increasingly resistant to its action.

It is the object of this invention to produce improved therapeutic agents which provide better control of blood sugar level than is achieved by present methods of treatment. To this end, research has been pursued into the properties of insulin derivatives, a field in which in spite of the efforts of many investigators few definite conclusions have emerged hitherto, due largely to failure to separate and adequately identify the individual components of the complex mixture which results from acylation and other reactions to which the parent insulins have been subjected.

More specifically one of the aims of the present invention is to produce insulin derivatives which are readily water-soluble, readily isolated from a reaction mixture, which have acceptable immunological properties and which retain an appreciable measure of the hypoglycaemic activity of the parent substance.

In accordance with this invention insulin derivatives fulfilling the above mentioned objects to a marked extent are those in which at least one of the amino groups of the $A_1$ (glycine), $B_1$ (phenylalanine) and $B_{29}$ (lysine) amino acid units is converted into a blocked amino group having a substituent capable of forming an anion. Preferably the substituent is one which when ionised carries a resultant negative charge and is thus free, for example, of other radicals such as amino groups which could confer overall electrical balance on the substituent.

Advantageously, at least two, and desirably all three, of the recited amino groups are converted to blocked amino groups by replacement of one or more hydrogen atoms therein.

The new insulin derivatives defined above are not only biologically active in their own right but are of additional interest as intermediates upon which further chemical modification of the insulin molecule may be effected thereby enabling further progress to be made towards providing more controlled and more effective therapy as hereinbefore mentioned. The additional modifications referred to are, as described in a co-pending application, effected at hydroxyl groups contained in tyrosine units in the insulin molecules. Blocking of tyrosine hydroxyl groups usually gives rise to a relatively inactive derivative but whereas amino group blocking is generally of a permanent nature, tyrosine blocking is intended as a temporary measure, the compound reverting slowly in vivo to its biologically active precursor. The latter effect takes place as a result of enzymic or chemical hydrolysis in vivo and depending on the choice of blocking group the rate of reversion will differ from derivative to derivative. The purpose of tyrosine blocking is to reduce the initial hypoglycaemic effect upon administration of the substance thereby enabling a higher dosage to be administered. Gradual reversion to an active derivative results therefore in a more level pattern of control of blood sugar. The overall effect aimed at employing insulin derivatives in this manner is one of prolongation of hypoglycaemic action.

Derivatives provided by this invention have caused a hypoglycaemic effect which has persisted for longer periods than that of the 4th International Standard for insulin when tested on the guinea pig.

Blocking of tyrosine hydroxyl groups is the subject of co-pending application Ser. No. 221,059 of Derek George Smyth of even date herewith.

One especially convenient type of blocking group for the purposes of the present invention is the acyl group and outstanding results have been obtained by controlled acylation of the parent insulins with functional derivatives of di-acids such as, for example, dicarboxylic acids, employing the appropriate acid anhydrides, acid halides or equivalent reagents. Many of the methods of acylation which are well known and extensively used in the field of peptide chemistry are applicable to the preparation of derivatives according to the invention. Acylation with such reagents results in the formation of N-substituents having free carboxyl groups which readily ionise to increase the overall negative charge on the insulin molecule. As a result of their enhanced negative charge, molecules of the insulin derivative are less liable to aggregate than those of the parent insulin and for this reason are much more readily soluble in aqueous solvents. Furthermore, this property may also account for the observed reduction in antigenicity of the acyl and other derivatives which constitutes a highly important property of the new derivatives of the present invention (antigenicity against antibodies directed against insulin).

A wide variety of dicarboxylic acid acyl groups may be introduced into the insulin molecule but it is found that the activity of the derivatives falls off after a certain point with increasing size of the substituent groups and for this reason it is preferred that the substituents contain no more than about six or about eight carbon atoms. Particularly good results are obtained with acyl groups derived from succinic, glutaric, maleic, monomethyl maleic and dimethyl maleic acids.

Acylation of insulins with dicarboxylic acid functional derivatives, e.g. anhydrides, is very conveniently amenable to control. If the reaction is carried out with a relatively small excess of acylating agent, e.g. from 2 to 3 moles per amino group and at neutral or mildly alkaline pH, e.g. 7 – 8, the reaction proceeds in very high yield with the formation of the di-substituted derivative resulting from reaction of the $A_1$ and $B_1$ amino groups. If the excess of acylating agent is markedly increased, e.g. up to 10 molar, the reaction can be made to proceed at the $B_{29}$ amino group to form the tri-substituted derivative. At a pH in the contemplated range the reaction is uncomplicated by O-acylation of tyrosine residues because stable O-acyl derivatives are not formed under these conditions. The resulting derivatives are insoluble at acid pH and may thus be readily removed from the reaction mixture by precipitation e.g. at pH 3.

The products so obtained can be separated by filtration or centrifugation and formulated as dry easily manageable powders. The products are readily soluble in aqueous media at pH 5 – 8, which simplifies their preparation and administration in comparison with the parent insulins. In some cases certain acyl groups are removed under strongly acid conditions and therefore caution is necessary in the recovery of products by the method described.

As indicated above at least one and preferably two of the insulin amino groups are blocked by anion-forming substituent radicals. The other amino groups in the insulin molecule may be left unsubstituted or, if desired, blocked with groups of the same or a different nature, i.e. not necessarily containing anionforming radicals, e.g. acetyl, carbamyl, N-substituted-carbamyl, e.g. N-methylcarbamyl and other N-alkyl carbamyl radicals. It is further contemplated that derivatives containing a variety of blocking groups in the same molecule may be desirable in order to achieve optimal prolongation effects due to improved resistance to aminopeptidase. Moreover, the use of mixtures of derivatives which allow optimisation of effects or other advantageous control of therapy is contemplated in accordance with this invention.

Typical products produced in accordance with the invention, e.g. the di- and tri- succinyl derivatives have been found to possess comparable but usually less initial hypoglycaemic activity than the parent insulins. This enables higher dosages to be used and because of the tendency of the derivatives to persist longer in the body, the effect is one of prolongation of hypoglycaemic action.

The compounds of this invention are conveniently handled and formulated as powders precipitated at acid pH. In such form the derivatives are at the isoelectric point. However physiologically acceptable salts of the derivatives may be used if desired. As with the parent insulins, zinc may be present in some form in the derivatives. Insulin derivatives in accordance with this invention may be formulated as pharmaceutical preparations in the same way as the parent insulins and may be used clinically at lower comparable, or higher dosage levels. Thus the normal daily dosage of insulin is from 20 to 80 international units per day for adults and for resistant patients more than 200 units and in some cases over 500 units of standard insulin. The derivatives of this invention can be prepared as solutions, suspensions, or freeze-dried preparations. A typical solution formulation is at neutral or physiological pH and contains sodium acetate 0.136 percent w/v, sodium chloride 0.7 percent w/v and methyl hydroxybenzoate 0.1 percent w/v in pyrogen - free water.

The present invention is applicable to all insulins and particularly the porcine and bovine insulins which have been used clinically for many years in the treatment of diabetes and other disorders. It is also applicable to synthetic insulins of this type and also to synthetic human insulin.

The invention is illustrated in the following Examples:-

EXAMPLE 1

Preparation of α-N',-ε-N''-trisuccinylinsulin Succinylation 500 mg of insulin is suspended in 12 ml of 0.5M phosphate buffer pH 7.2 (41.6 mg per ml) and to this suspension is added directly 250 mg solid succinic anhydride (10 fold molar excess of reagent per amino group). The reaction mixture is stirred continuously at room temperature for 20 hours. The clear solution (after reaction) is observed to remain homogeneous when the pH is adjusted to 5.5.

Resalting of the reaction mixture either by (i) or (ii)

(i) The total reaction mixture is passaged through a Sephadex G–15 column (150 × 1.5 cm), eluting with 0.05M pyridine acetate buffer pH 5.5. The insulin derivatives are well separated from the breakdown products of the reagent. The derivatives emerge in a relatively large volume of the choice eluent but are still suitable for chromatography.

(ii) Alternatively, the insulin derivatives are precipitated at 4°C by acidification of the reaction mixture to pH 3.8 with glacial acetic acid. The precipitate is then washed twice with cold distilled water previously acidified to pH 4 with acetic acid. The yield of the insulin derivatives in the precipitate is over 90%. The precipitate is dissolved in 5 ml of pyridine acetate pH 6 for chromatography.

Purification of the insulin derivatives

The solution of insulin derivatives is applied to a DEAE-Sephadex A-25 column (95 × 1.5 cm). Elution is carried out initially with 60 ml of 0.05M pyridine acetate pH 5.5 before a linear NaCl gradient to the limiting concentration of 2.0M is applied. The disuccinylated derivative is eluted off the A-25 gel first at the NaCl molarity of 0.475; the trisuccinylated - at 0.6. Separation of the derivatives in this manner is readily accomplished without the use of 7M urea in the eluent and the yield of the derivatives is over 90 percent.

Characterisation of the derivatives

The pure insulin derivative obtained is either resalted suitably with a Sephadex G–15 column or precipitated as previously. Further washing of the precipitate with cold 95 percent ethanol followed by diethyl ether (twice) prior to drying in a vacuum desicator results in a white powder which is then characterised by:

i. Tryptic digestion at pH 9.5 with a T.P.C.K.-treated trypsin to substrate ratio of 1 to 7 for the release of B-30 alanine.

ii. Cellulose acetate electrophoresis and staining with Pancean S.

iii. Carbamylation with KCNO for quantitative assay of —NH$_2$ terminal groups.

iv. Disc-gel (acrylamide) electrophoresis.

Using this method of preparation, the yields of the tri- and disuccinylated derivatives are 90.6 percent and 9.3 percent respectively. No —NH$_2$ terminal end groups can be detected for either derivative. Free alanine can be liberated by tryptic digestion from the disuccinylated derivative; and none from trisuccinylinsulin. The two derivatives can be separated by electrophoresis.

EXAMPLE 2

Preparation of α-N,N'-disuccinylinsulin

In order to prepare disuccinylinsulin specifically, the succinylation reaction conditions described in Example 1 are altered thus: three molar excess of succinic anhydride per amino group and reaction for 4 hours at room temperature. The reaction mixture is desalted by precipitation and the insulin derivative dissolved in pH 8 buffer and allowed to stand at room temperature for 20 hours before purification.

EXAMPLE 3

Preparation of α-N-succinylphenylalanineinsulin α-N-succinylglycineinsulin,, ε-N-succinyllysineinsulin and α-N-succinylglycine-ε -N-succinyllysineinsulin These derivatives are prepared, together with those of Examples 1 and 2, by the use of different succinylation reaction conditions, the various derivatives being separated chromatographically.

Reaction of insulin with succinic anhydride

Bovine crystalline insulin (200 mg, containing 0.336 percent zinc) is dissolved in 10 ml M-tris HCl pH 8.6. To this is added succinic anhydride (20.4 mg, equivalent to two fold molar excess per amino group). The reaction mixture is stirred at room temperature for 3 hours. The insulin derivatives are desalted by gel filtration on a column (35 × 2.5 cm) of Sephadex G-25 (coarse grade) in 0.1 percent N-ethylmorpholine acetate pH 8.5 and isolated by lyophilization.

Chromatographic separation of the insulin derivatives

The freeze-dried mixture is dissolved in 5 ml of 0.1M-tris HCl pH 7 containing 8M urea (freed from cyanate by acidification) and added to a DEAE Sephadex A-25 column (95 × 1.5 cm) which is equilibrated and developed initially with 200 ml of the above buffer. A linear gradient of NaCl is then applied up to a limiting concentration of 0.2M by passing 0.1M-tris pH 7 containing 8M urea and 0.2M NaCl (250 ml) into a mixing vessel containing 250 ml of the starting buffer. The flow rate is 15 ml per hour. With this chromatographic procedure, 6 insulin derivatives are obtained as indicated in the following table:

liberated from the resultant derivative by tryptic digestion.

In an alternative procedure the buffer used in the desalting is 0.1 percent N-ethylmorphaline acetate at pH 8.5

We claim:

1. A mono-, di- or trisubstituted insulin in which the substituents are located on one or more of the amino groups of the $A_1$ (glycine), $B_1$ (phenylalanine) and $B_{29}$ (lysine) amino acid units, at least one of said groups being monoacylated with the monobasic acyl residue of a dicarboxylic acid selected from the group consisting of succinic acid and glutaric acid.
2. An insulin according to claim 1, in which the acid is succinic acid.
3. An insulin according to claim 1 in which at least two of the recited amino groups are acylated.
4. An insulin according to claim 3 which is tri-N substituted.
5. An insulin according to claim 1 in which one or two of the recited amino groups which are not acylated are carbamylated or N-methyl carbamylated.
6. An insulin according to claim 1 in which the acid is glutaric acid.
7. $A_1$(glycine)-N-succinyl insulin.
8. $B_1$(phenylalanine)-N-succinyl insulin.
9. $B_{29}$(lysine)-N-succinyl insulin.
10. $A_1$(glycine),$B_1$(phenylalanine)-N,N'-disuccinyl insulin.

| Compound | $NH_2$ Groups substituted[1] | Molarity of NaCl at which eluted M | Yield % |
|---|---|---|---|
| Insulin | — | — | 40 |
| α-N-succinylphenylalanineinsulin ($B_1$ substituted) | Phe | — | 14 |
| ε-N-succinyllysineinsulin ($B_{29}$ substituted) | Lys | — | 3 |
| α-N-succinylglycineinsulin ($A_1$ substituted) | Gly | — | 12 |
| α-N,N'-disuccinylinsulin ($A_1B_1$ substituted) | Phe, Gly | 0.12 | 12 |
| α-N-succinylglycine-ε-N-succinyllysine-insulin ($A_1B_{29}$ substituted) | Gly, Lys | 0.13 | 8 |
| α-N,N'-ε-N''-trisuccinylinsulin ($A_1B_1B_{29}$ substituted) | Gly, Phe, Lys | 0.2 | 7 |

[1] The free α-$NH_2$ groups are determined as for characterization method (iii) of Example I whilst the ε-$NH_2$ groups are determined as for characterization method of (i) of Example I.

EXAMPLE 4

Preparation of α-N,N'-ε-N''-triglutarylinsulin

This derivative is prepared using glutanic anhydride by an exactly analogous procedure to that described in Example 1 for the trisuccinyl derivative.

EXAMPLE 5

Preparation of α-N,N'-disuccinyl-ε-N''-carbamylinsulin

Pure disuccinylinsulin is carbamylated at pH 8 with 0.5M KCNO. The reaction mixture is stirred at room temperature for 12 hours and then desalted by passage through a Sephadex G-15 column (150 × 1.5 cm) with 0.05M phosphate buffer pH 9. No free alanine can be 11. $A_1$(glycine), $B_1$(phenylalanine), $B_{29}$(lysine)-N,N',N''-trisuccinyl insulin.
12. $A_1$(glycine),$B_1$(phenylalanine), $B_{29}$(lysine)-N,N',N''-triglutaryl insulin.
13. $A_1$(glycine),$B_1$(phenylalanine)N,N'-disuccinyl-$B_{29}$(lysine)-N''-carbamyl insulin.
14. $A_1$(glycine),$B_{29}$(lysine)-N,N''-disuccinyl insulin.
15. A process for the preparation of an insulin according to claim 1 which comprises acylating one or more of the $A_1$, $B_1$ and $B_{29}$ amino groups of insulin with a member selected from the group consisting of succinic anhydride and glutaric anhydride in an excess of from 2 to 10 moles for each of said amino groups per mole of insulin.
16. A process according to claim 15 in which the product is separated from the reaction mixture by precipitation at acid pH.

17. A process according to claim 15, in which an excess of the anhydride of from two to three moles for each amino group per mole of insulin is used thereby effecting predominantly disubstitution.

18. A process according to claim 15, in which an excess of the anhydride of ten moles for each amino group per mole of insulin is used thereby effecting predominantly trisubstitution.

* * * * *